US00RE42839E

(19) United States
(12) Reissued Patent
Jaeger et al.

(10) Patent Number: US RE42,839 E
(45) Date of Reissued Patent: Oct. 18, 2011

(54) GLOVE HAVING MOLDED RUBBER PALM PATTERN WITH A PORTION THAT ROLLS OVER FINGERTIPS

(75) Inventors: Eduard A. Jaeger, El Segundo, CA (US); Eric M. Jaeger, El Segundo, CA (US)

(73) Assignee: Ironclad Performance Wear Corp., El Segundo, CA (US)

(21) Appl. No.: 12/220,489

(22) Filed: Jul. 25, 2008

Related U.S. Patent Documents

Reissue of:
(64) Patent No.: 7,100,212
Issued: Sep. 5, 2006
Appl. No.: 10/215,946
PCT Filed: Aug. 10, 2002

(51) Int. Cl.
*A41D 19/00* (2006.01)

(52) U.S. Cl. ..... 2/161.1; 2/16

(58) Field of Classification Search ..... 2/16, 20, 2/160, 161.6, 163, 168, 169
See application file for complete search history.

(56) References Cited

U.S. PATENT DOCUMENTS

| | | | | | |
|---|---|---|---|---|---|
| 1,979,130 | A | * | 10/1934 | Wiley | 2/168 |
| 2,581,249 | A | * | 1/1952 | Ganz | 427/282 |
| 4,051,553 | A | * | 10/1977 | Howard | 2/20 |
| 4,785,479 | A | * | 11/1988 | Watanabe | 2/163 |
| 5,598,582 | A | * | 2/1997 | Andrews et al. | 2/16 |
| 5,659,899 | A | * | 8/1997 | Soter et al. | 2/160 |
| 5,661,853 | A | * | 9/1997 | Wilmot | 2/163 |
| 5,687,424 | A | * | 11/1997 | Masley | 2/163 |
| 5,692,242 | A | * | 12/1997 | Tekerman et al. | 2/161.1 |
| 6,098,199 | A | * | 8/2000 | Barkin | 2/159 |

* cited by examiner

*Primary Examiner* — Katherine Moran
(74) *Attorney, Agent, or Firm* — Irving Keschner

(57) ABSTRACT

A fitted glove structure that incorporates a molded rubber palm piece that has a portion which extends over certain of the glove fingertips to the back piece in a manner to increase wearer comfort and protection and to enhance the object pick up capabilities of the glove.

3 Claims, 3 Drawing Sheets

GLOVE HAVING MOLDED RUBBER PALM PATTERN WITH A PORTION THAT ROLLS OVER FINGERTIPS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention provides an improved glove construction wherein the palm pattern comprises a molded rubber piece having a portion which rolls over the fingertips.

2. Description of the Prior Art

Gloves specifically designed for use in the construction industry have been available in the prior art. For example, Ironclad Performance Wear Corp., Los Angeles, Calif., sells a variety of gloves having a palm piece attached to a back piece through the use of fourchettes. The glove fingers are attached to the palm and back pieces across the tips of the fingers, down the side of each finger and down through the crotch between each finger. The Ironclad gloves typically have a pattern on the palm piece to protect the user hand from strain, vibration or abrasion.

U.S. Pat. No. 5,490,290 to Gold discloses a glove structure wherein the palm piece is attached to the back piece through the use of connector strips made from stretchable elastic fabric, such as spandex.

The problems with the conventional glove design is that sensitivity is reduced as the typical glove has materials (4) coming together at one point; wearer fingernails tend to hang up on seams reducing the utility and mobility when the gloves are worn; seams in the central wear area cause the glove material wearing out; the presence of multiple materials and seams reduces wear comfort; the plural seams and materials increases the likelihood that the glove will snag on outside items such as nails and screws; and the fingernails are susceptible to damage because of the thin and lighter palm material used in conventional gloves.

Ski gloves have been available which include an inner glove portion and an outer shell glove portion which includes a palm design that wraps up and over the fingertips. This ski glove construction is not a single, fitted glove, is primarily limited to skiing and other winter sport activities and is not designed to be long lived.

What is thus desired is to provide a glove construction whereby the above noted disadvantages are substantially eliminated.

SUMMARY OF THE INVENTION

The present invention provides a fitted glove structure that incorporates a palm piece having a molded rubber palm pattern that includes a portion which rolls over to the back piece in a manner that increases fingertip sensitivity, increases the mobility and efficiency of the wearer, increases glove lifetime, increases wearer comfort and increases fingernail protection.

In particular, the palm piece and back piece on the second, third and fourth finger are joined by fourchettes, preferably made of reinforced stretched nylon, the palm material is preferably made of synthetic leather, the top hand material is stretched nylon and the palm pattern is made of heat pressable rubber. A portion of the molded rubber palm pattern, according to the teachings of the present invention, extends over the fingertips (except the thumb) and is sewn to the stretch nylon on the top portion of the back piece.

The molded rubber palm pattern with the roll over fingertip portion is unique in work gloves. The glove construction of the present invention eliminates the seam lines on the fingertips resulting in a smooth layer of material over the entire fingertip and a substantial increase in finger tactility. This increase in tactility provides a glove that is more comfortable and more functional than available in the prior art. A user can pick up small objects such as coins, nails, screws, buttons, etc, and will also have a heightened awareness of the contact environment—smooth vs. rough, for example. By altering material selections, the design can be incorporated into gloves that are meant for work with small, delicate objects as well as highly abrasive environments.

The individually molded rubber palm allows for a new glove design. Currently, the only options available for glove designers involved material choices and patterns. Although material choices are varied, this can still be very limiting—trade offs need to be made in terms of flexibility, chemical resistance, thermal resistance, grip characteristics, wet, dry or oily environments, etc.

An individually molded rubber palm pattern eliminates these trade offs. By individually molding a palm, three dimensional characteristics are incorporated to address different gripping needs—non-slip, cement block, glass, demolition, wet or oily environments, etc, that before could only be addressed by two dimensional material choices. Additional functionalities such as vibration and shock absorption are also addressed with three dimensional solutions, rather than gel or foam inserts. Multiple functionalities are incorporated into one glove, with different portions of the glove having different and complimentary functions (for example, non-slip fingers and a shock absorbing palm), all within the same one mold. This is a very cost effective solution for multiple purpose gloves. Another advantage to a molded palm is the ability to use polymer chemistry to enhance functionality. The rubber can be tailored to meet specific needs—heat resistance and insulation, low temperature resistance, oil and chemical resistance, flame resistance, abrasion, cut and puncture resistance, electrical resistance, etc. The durometer of the rubber compound is adjustable as required for the purpose of the glove and chemical additives can be used to enhance any of these properties. In addition, specific colorants can be added, as well as reflective and fluorescent chemicals, to create specific visibility patterns. Due to the advanced nature of molding technologies, these different polymer characteristics can be designed into different parts of the glove. The fingers can have a different color, durometer and abrasion resistance than the palm of the glove, for example. Finally, by studying the articulation of the hand, the rubber palm is designed with flex points that match the natural joint and flex locations on the fingers, thumb and palm.

The present invention thus provides a fitted glove configuration that increases wearer comfort and also provides increased protection to the wearer's hand and enables various types of objects to be grasped by the user while increasing glove lifetime.

DESCRIPTION OF THE DRAWINGS

For a better understanding of the present invention as well as other objects and further features thereof, reference is made to the following description which is to be read in conjunction with the accompanying drawing therein.

DESCRIPTION OF THE INVENTION

Figure 1:
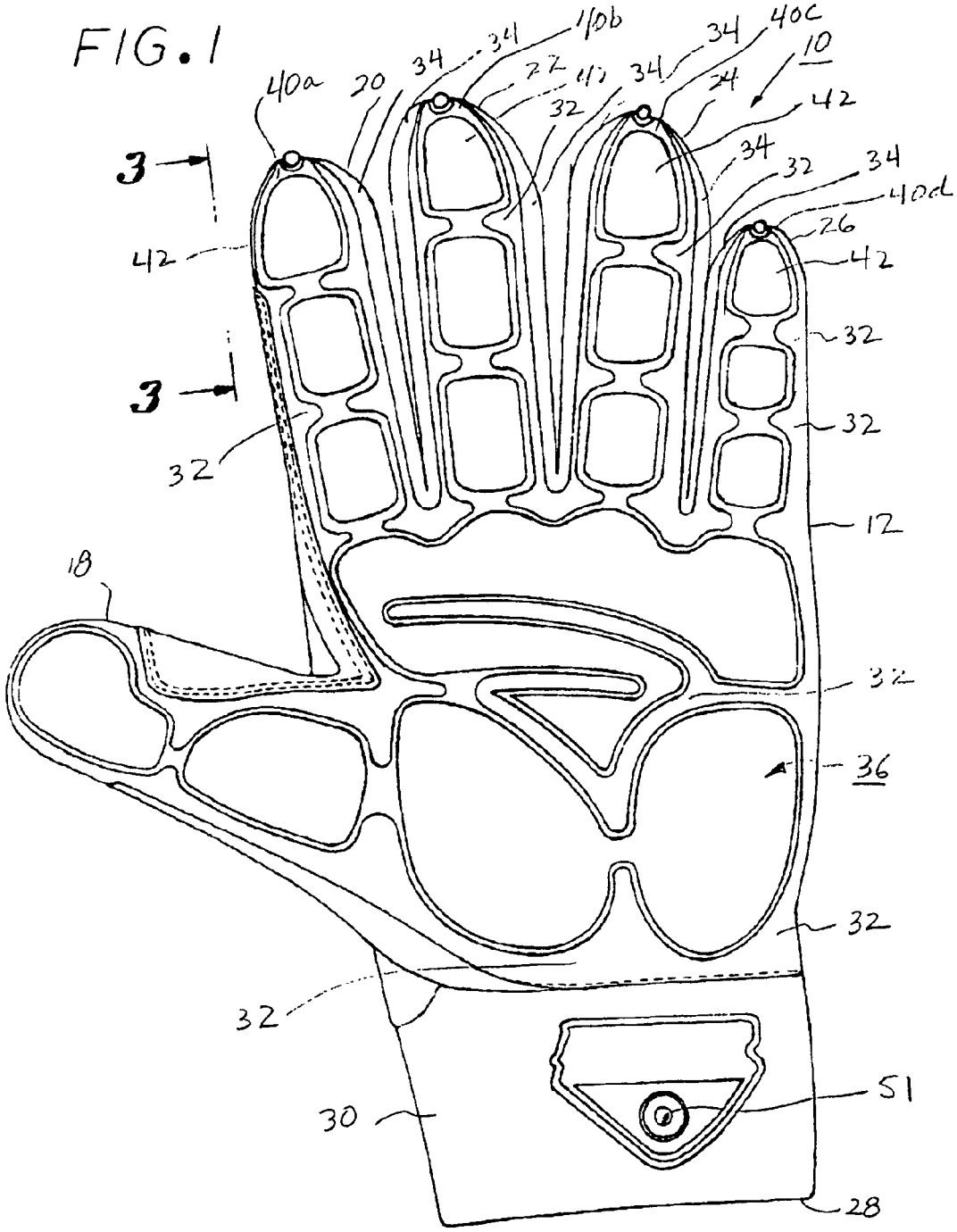
FIG. 1 is a perspective view showing the palm piece of a glove constructed in accordance with the teachings of the present invention.

FIG. 1 is a plan view showing the palm piece 12 of the fitted glove 10 of the present invention. The glove 10 is in the shape of a human hand and comprises two pieces, palm piece 12 and a back piece 14 (shown in FIG. 2). Palm piece 12 comprises a thumb portion 18, finger portion 20 (index finger), 22 (middle finger), 24 (ring finger) and 26 (pinkie finger). An opening is provided at the bottom 28 of the glove 10 to allow a wearer to insert his or her hand.

Figure 3:
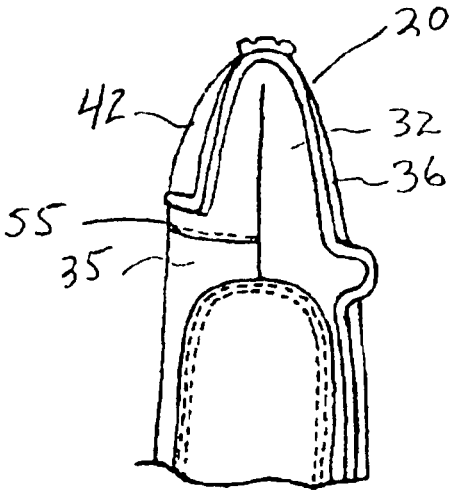
FIG. 3 is a partial side view along line 3—3 of FIG. 1.
Figure 4:
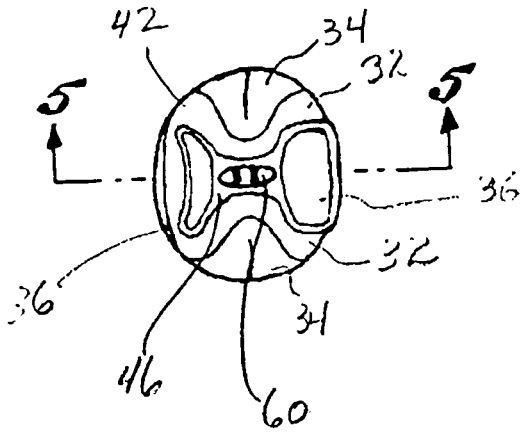
FIG. 4 is a top view of the glove fingertip shown in FIG. 3.

Palm piece 12 comprises a breathable, stretchable support material 30. such as Cool Flex, a synthetic leather material 32, such as suede, fourchettes 34, preferably fabricated from reinforced, stretchable nylon, such as Spandura (a registered trademark of H. Warshaw & Sons, Inc., New York, N.Y.) connecting the index and middle fingers, the middle and ring fingers and the ring and pinkie fingers as illustrated, stretchable material 35, such as spandex and palm pattern 36, made of rubber. In accordance with the teachings of the present invention, palm pattern 36, in the preferred embodiment, is a single piece comprising molded rubber and comprises a plurality of discrete patterns as illustrated positioned to minimize wear and abrasions to the hand of the user. In accordance with a further teaching of the present invention, the vertically extending palm patters 40(a), 40(b), 40(c) and 40(d) formed on the top portion of the index, middle, ring and pinkie fingers, respectively which extend substantially along the entire length of each finger, each have a portion 42 which extends, or rolls, over the tops of these fingers as illustrated more clearly in FIGS. 2, 3 and 4 (FIG. 3 illustrates index finger 20 and the description of the glove construction is equally applicable to fingers 22, 24 and 26). The entire rubber mold palm pattern 36 is glued, heat pressed (using predetermined temperatures and pressures in a conventional manner) and then sewn to the synthetic leather portion 32.

Figure 2:
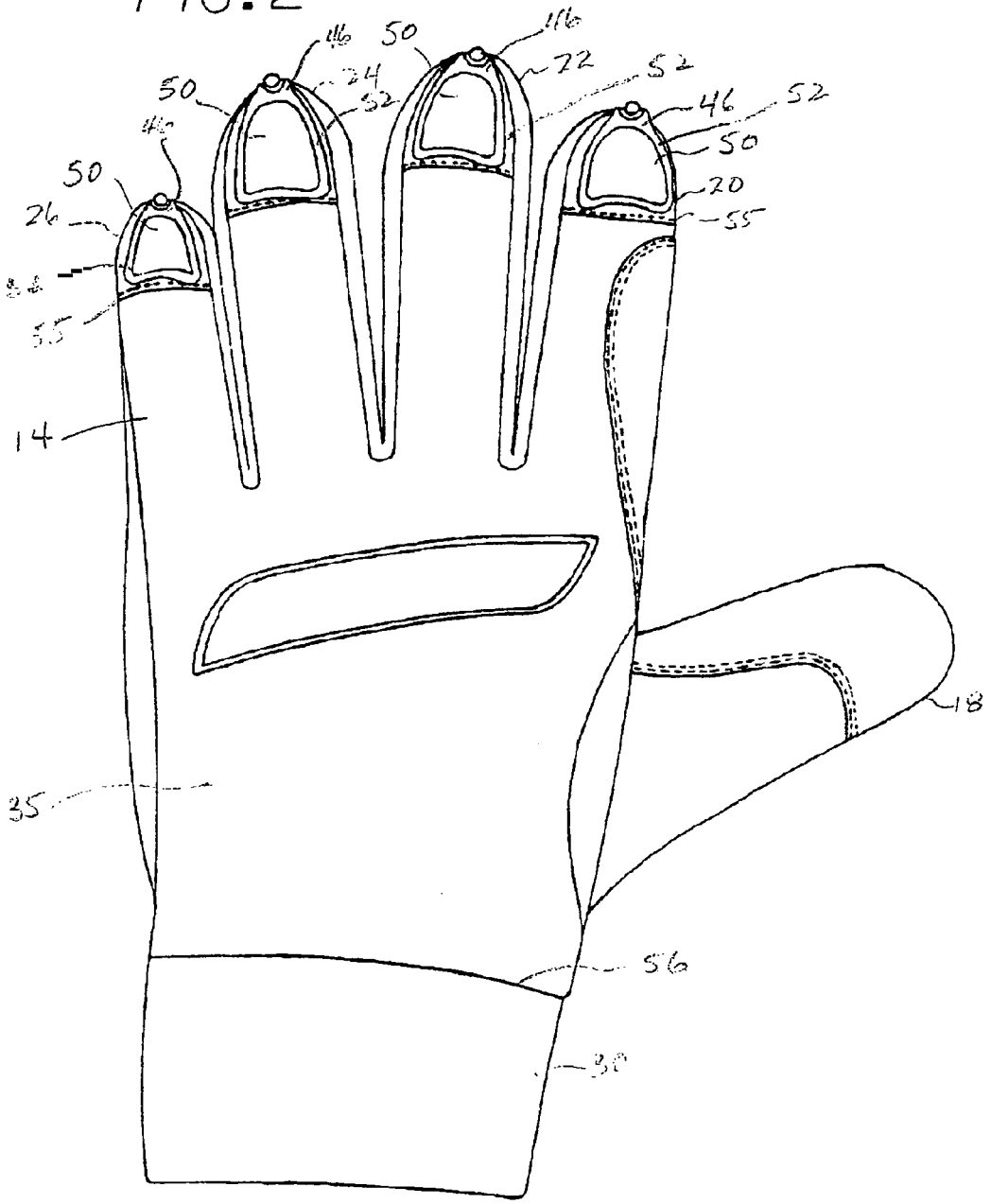
FIG. 2 is a perspective view of the back piece of the glove construction shown in FIG. 1.

The upper portions of palm pattern 36 adjacent the tips of finger portions 20, 22, 24 and 26, have a portion 46 which is reduced in width, and extends from portions 42, rolls over the fingertip areas and increases in width to form pattern portions 50 (see FIG. 2). The extended glove portion, as illustrated, has an hourglass shape. Support material 30 (FIG. 1) includes a male connecting post 51 which is used to join glove 10 to the mating glove (not shown), the mating glove having a receptacle to receive post 51. Although the pattern portions 50 are illustrated as only extending partially down backpiece 14, it should be noted that the present invention contemplates that portions 50 can extend down the backpiece 14 to other lengths, including to the bottom portion of backpiece 14. It should be clear that portions 42 and 50 and the other patterns illustrated are part of the single, integral molded rubber palm pattern 36. Although this is the preferred arrangement for manufacturing efficiency, a palm pattern comprising a plurality of molded rubber parts can also be used.

The rubber molded material 36 may be fabricated from different polymers to provide different properties for the glove construction, i.e. more heat resistant, more chemical resistant, etc. For example, the thumb and palm areas can have shapes and characteristics that differ from each other. In addition, different polymers can be used in different glove locations to create different localized protections. Examples of different polymers which can be used are TPE (thermoplastic elastomer), latex and natural rubber, silicone, butyl, neoprene, polyurethane, urethane and vinyl. In addition, the individual rubber material 37 can be made with an infinite range of durometers which change over various portions of the glove.

Although not illustrated, the mold pattern is preferably omitted from the joint, or flex, areas, of the palm and fingers. This design still allows the areas of exposed synthetic leather 32 to be protected from abrasive elements when the hand is flexed while grasping an object. In addition, a single recessed sewing channel around the entire molded rubber piece 36 may be provided so that the sewing thread is protected from abrasion is preferred, although multiple sewing channels can be used. Both of these features are disclosed in copending application Ser. No. 10/215,703, filed Aug. 10, 2002 and entitled "Improved Glove Constuction" by Eric M. Jaeger, assigned to the assignee of the present invention, the teachings of which necessary for the an understanding of the present invention being incorporated herein by reference.

FIG. 2 is a plan view of the back piece 14 and illustrates the roll over portions 46 and 50 in more detail. As noted hereinabove, patterns 46 and 50 are bonded to synthetic leather portion 52, portion 52 in turn being sewn at 55 to stretched nylon material 35. Nylon material 35 is sewn to support material 30 at 56.

Figure 5:
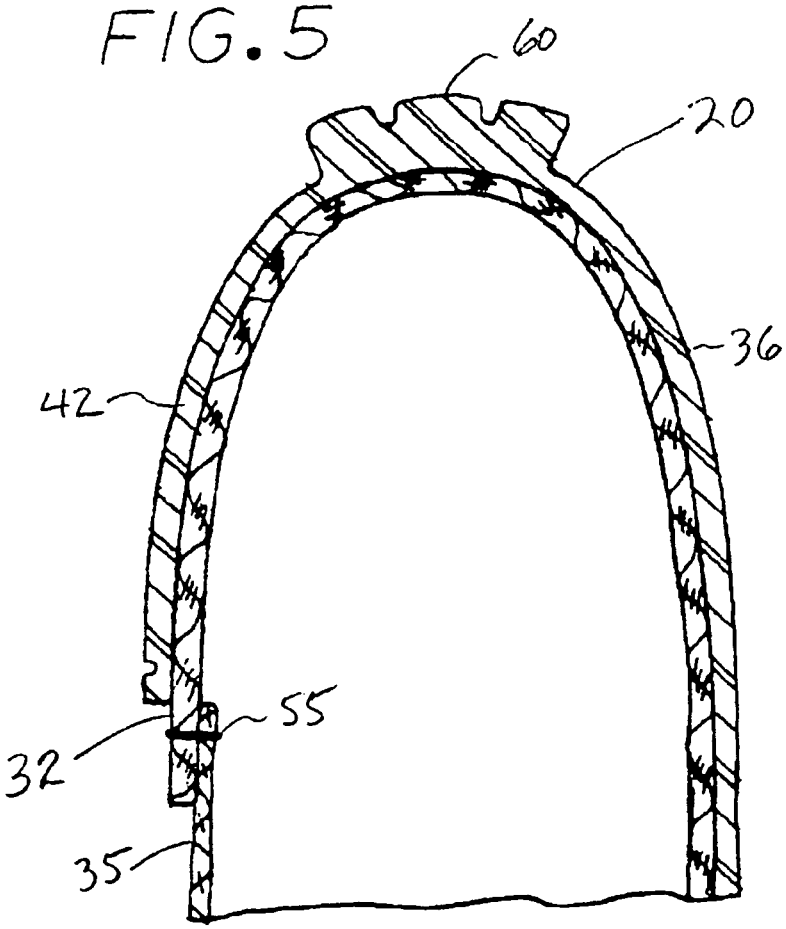
FIG. 5 is a cross-sectional view along line 5—5 of FIG. 4.

FIG. 5 is a partial cross-sectional view of fingertip 20 and illustrates ridges 60 formed on the top of the cross-over palm pattern portion 46 and the attachment of synthetic material 32 to stretchable material 35 along sewn stitch line 55.

The present invention thus provides a glove construction that increases fingertip sensitivity of the wearer, increases wearer comfort while protecting the wearer's fingernails and also increases glove lifetime.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A glove construction comprising: glove back means formed in the shape of a human hand for forming a portion of the back of the glove;

a glove palm piece formed in the shape of a human hand comprising a thumb portion, finger portions *having fingertips* and a palm area, said glove palm piece having a surface, said glove back means and said glove palm piece forming a portion of the glove when joined together;

strips of material forming both sides of said finger portions joined to said glove back means and said glove palm piece along the length of each finger portion; and a molded three dimensional rubber member secured to the surface of said palm piece in a manner such that the molded rubber member has portions secured to said finger portions, said thumb and said glove palm area, the portions of said molded rubber member secured to said finger portions, said thumb and said palm area having shapes and characteristics that differ from each other to provide a palm piece having multi-functional capabilities, said portion of said molded rubber member secured to said finger portions extending over *at least two of* the fingertips and secured to said glove back means, said molded rubber finger portions extending substantially along the entire length of each finger.

2. The glove construction of claim 1 wherein each of said extended portions have a width that varies as it extends over each fingertip.

3. The glove construction of claim 2 wherein each of said extended finger portions have an hourglass shape.

* * * * *

UNITED STATES PATENT AND TRADEMARK OFFICE

CERTIFICATE OF CORRECTION

PATENT NO. : RE42,839 E
APPLICATION NO. : 12/220489
DATED : October 18, 2011
INVENTOR(S) : Jaeger et al.

It is certified that error appears in the above-identified patent and that said Letters Patent is hereby corrected as shown below:

On the Title Page:

Item [64], Replace sub-heading, PCT Filed: with sub-heading, Filed.

Signed and Sealed this
First Day of November, 2011

David J. Kappos

David J. Kappos
*Director of the United States Patent and Trademark Office*